United States Patent Office 3,512,499
Patented May 19, 1970

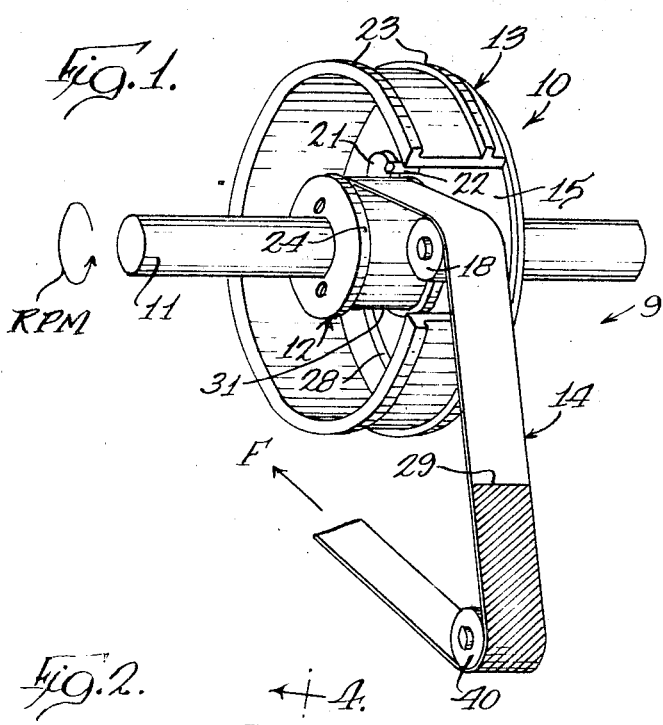
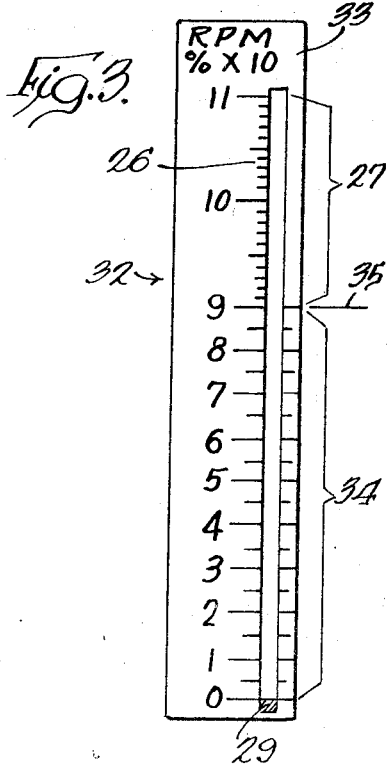
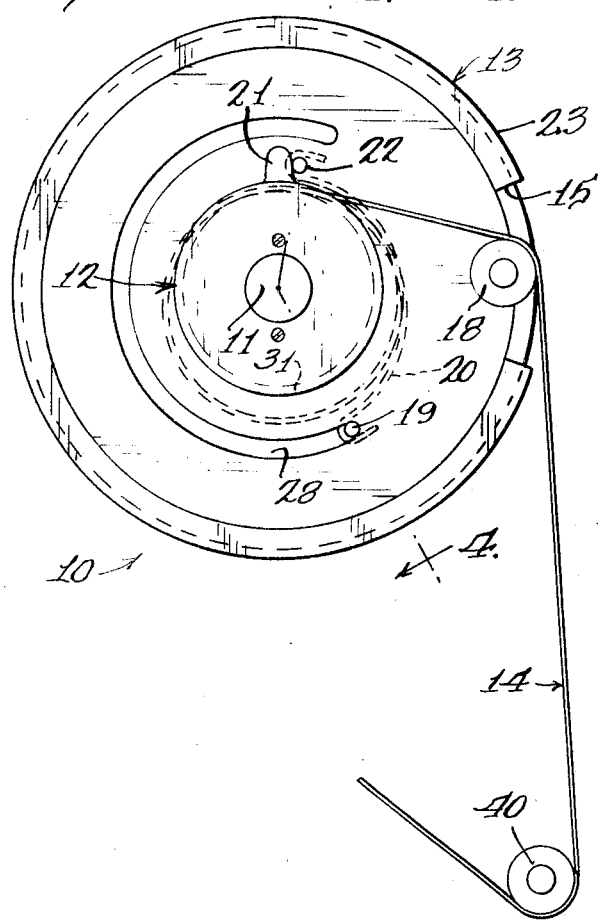
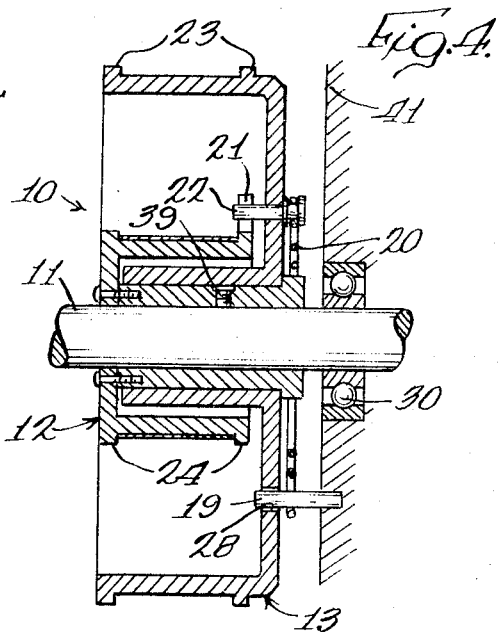

1

3,512,499
LINEAR SCALE INSTRUMENT WITH VARIABLE SPEED TAPE DRIVE
William G. Runde, Pompano Beach, and Arthur J. Bromley, Lauderdale-by-the-Sea, Fla., assignors to McGraw-Edison Company, a corporation of Delaware
Filed Jan. 22, 1968, Ser. No. 699,686
Int. Cl. G01d 13/06
U.S. Cl. 116—129          13 Claims

ABSTRACT OF THE DISCLOSURE

A linear scale instrument with an expanded scale portion and having drive means for automatically changing the drive ratio between the input shaft of the instrument and the indicator at the point at which the indicator crosses over between the expanded scale portion and the normally calibrated portions of the scale. The drive means including a pair of different diameter, concentric drums on which an indicator tape is alternatively wound to achieve different drive ratios as the readout line traverses the different scale portions.

BACKGROUND OF THE INVENTION

This invention relates to a linear scale instrument and more particularly, to a linear scale instrument with an expanded scale portion.

Aircraft instruments must be designed so that the pilot can make an accurate reading with a quick glance. Since the aircraft's normal operating range is over a small part of the total range of the instrument, valuable control panel space can be conserved by employing an expanded scale portion to correspond to the aircraft's normal operating range. A normal scale is used to measure the remainder of the total range. Thus, very accurate readings are possible in the critical operating area of the aircraft's engines with a savings of the valuable control panel space.

One of the problems encountered in incorporating the expanded scale feature into a linear scale instrument is that of obtaining an instantaneous changeover in the indicator's speed as it crosses into the expanded scale portion to insure accurate readings. Heretofore, various complex drive arrangements have been used to solve this problem.

This invention relates to a linear scale instrument with an expanded scale portion and employing a unique and simple drive drum arrangement which solves the instantaneous speed changeover problem discussed above.

SUMMARY OF THE INVENTION

The variable speed drum assembly of this invention is designed to drive a tape in several fixed proportional relationships to the rotation of an output shaft the position of which is to be shown by the tape indication. The drum assembly comprises two concentrically mounted drums. The inner drum is keyed to the shaft and the outer drum is rotatably mounted.

One end of the indicator tape is attached to the inner drum and coils around this drum as the shaft starts to rotate. Lost motion means are provided on the inner drum to engage and drive the outer drum after the inner drum has rotated through a predetermined angle. When the outer drum starts to rotate, the indicator tape then begins to wrap around its outer periphery causing the tape to be coiled at a more rapid rate.

The exposed or visible portion of the tape moves adjacent to a display scale which has an expanded scale portion. The readout line on the tape is correlated with the expanded portion of the scale so that the readout line

2 enters the expanded scale portion as the indicator tape begins coiling on the outer drum.

Accordingly, it is an obrect of this invention to provide tape display instruments having the expanded scale feature by using a unique and simple drive arrangement.

Another object of this invention is to provide a linear scale, tape display instrument having a drive arrangement that makes an instantaneous change of tape speed as the indicator or readout line crosses into the expanded scale portion.

These and other objects and features of the invention are pointed out in the following description in terms of the embodiments thereof which are shown in the accompanying drawings. It is to be understood that the drawing is for the purpose of illustration only and is not a definition of the limits of the invention, reference being had to the appended claims for this purpose.

BRIEF DESCRIPTION OF THE DRAWING

FIG. 1 shows one embodiment of a variable speed drive drum assembly of this invention;

FIG. 2 is an end elevation view of FIG. 1;

FIG. 3 shows the calibrated instrument face having an expanded scale portion for cooperation with the variable speed drive drum of FIGS. 1 and 2; and FIG. 4 is a sectional elevation taken along the lines 4—4 of FIG. 1.

DESCRIPTION OF THE PREFERRED EMBODIMENT

Referring to FIG. 1 of the drawings, there is shown a vertical or linear scale instrument designated generally by reference numeral 9. Variable speed drum assembly 10 drives tape 14 by virtue of the rotation of shaft 11. Shaft 11 represents the output shaft of any of a sensing device in which the shaft position is indicative of a quantitative measurement. More specifically, the shaft 11 may be a servo-driven shaft correlated with the position of a potentiometer. It should be understood that the rotary displacement of shaft 11 is directly proportioned to the quantitative measurement which, in the illustrated embodiment, is in percent of rated engine speed as measured in revolutions per minute.

In any instrument, there is usually a range on the indicator scale in which the instrument reading usually falls or which is of more critical interest. Oftentimes, it is desirable to have a more precise reading in that range or to have the instrument easier to read in that range. This objective may best be achieved by expanding the scale of the instrument in this particular range of readings.

Since the input to the instrument is normally linear or directly proportional, it is necessary to provide means in the instrument for changing the drive ratio between the instrument input and the indicator. In this way, the indicator moves at different rates to cooperate with and give accurate instrument readings on a display scale having a first portion with uniformly spaced graduations and a second portion with uniformly spaced graduations which are more widely spaced than the first portion. For the purpose of providing two different drive ratios, the instrument 9 includes the drum assembly 10 which consists of an inner drum 12 and an outer drum 13 which are of different diameters as is obvious from the drawings. The drums 12 and 13 are mounted on shaft 11 by means whereby the indicator tape 14 winds alternatively on one or the other of these drums. Inner drum 12 is securely attached to shaft 11 by screw means 39 so as to rotate therewith. Outer drum 13 is rotatably mounted concentric with inner drum 12. The sectional view of FIG. 4 shows one method of rotatably mounting outer drum 13.

To avoid the weight of drum assembly 10 placing a severe strain on shaft 11, shaft 11 is given support adjacent to drum assembly 10 by bearings 30 mounted in stationary wall 41, which may be the wall of the instrument housing.

It is fundamental that tape 14 is driven at a much faster speed as it coils around outer drum 13 in comparison to its speed when coiling around inner drum 12. Tape 14's speed around outer drum 13 as compared with inner drum 12 increases by a factor directly proportional to the ratio of their diameters. Since the relative speed at which the indicator line 29 on tape 14 traverses the two portions of scale 26 determines the scale factor between the two scale portions, the expanded scale factor is also directly proportional to the diameter ratio of outer drum 13 to inner drum 12.

The critical adjustment feature in the design of instrument 9 is to correlate the operation of drum assembly 10 with movement of readout line 29 along scale 26 such that tape 14 starts to wrap around outer drum 13 at the exact same moment that readout line 29 enters into expanded scale portion 27.

To insure perfect correlation between drum assembly 10 and indicator tape 14 it is essential that outer drum 13 remains in the stationary position shown in FIGS. 1 and 2 during the initial rotation of shaft 11 and inner drum 12 in a counterclockwise direction. Outer drum 13 is held stationary during this initial period by a constant clockwise force which urges one end of slot 28 against stop pin 19, as shown in FIG. 2. This clockwise force is provided by the combined action of torsion spring 20 and tape 14 as it passes over idler roller 18. Torsion spring 20 is stretched between stop pin 19 and drive pin 22 around the right side of drum assembly 10 as viewed from FIG. 2 to provide a downward force. A downward force is likewise exerted by tape 14 as it passes over idler roller 18.

One end of tape 14 is attached to inner drum 12 at 31 and the other end of the tape is attached to a tape tensioning spring (not shown in the drawings). The force of the tape tensioning spring must be sufficient to hold tape 14 taut when drum assembly 10 is in its initial rest position. From end 31, tape 14 wraps around drum 12 and passes out of drum assembly 10 through an opening 15 in outer drum 13. Tape 14 then extends downwardly and passes over idler roller 40 to the tape tensioning spring.

A tape tensioning spring (not shown in the drawings) exerts a nearly constant force F on tape 14 in the direction shown in FIG. 1, to bias the tape against the releasing action of the drum assembly 10 and acts on the tape to maintain tape tension. In addition, this tension spring assists torsion spring 20 in turning outer drum 13 clockwise back to its resting position (shown in FIGS. 1 and 2).

During the initial rotation of shaft 11 and inner drum 12, tape 14 is drawn over idler roller 18 and coils around inner drum 12 until finger member 21 engages drive pin 22. Finger member 21 is an integral projection of annular flange 24 for the purpose of engaging drive pin 22 after inner drum 12 has rotated less than a complete revolution.

To provide for an instantaneous change in the rate of speed when tape 14 starts to coil around outer drum 13, idler roller 18 is mounted on outer drum 13 adjacent to a starting edge of the opening 15. Idler roller 18 causes tape 14 to start coiling around outer drum 13 at a point of tangency to the radius of the outer drum, as can best be seen in FIG. 2.

Outer drum 13 and inner drum 12 are provided, respectively, with annular flanges 23 and 24 to serve as guideways for tape 14 so that it will coil uniformly around the two drums.

The drum assembly 10 and the tape 14 are associated with an indicating instrument 32 having a display face 33 upon which is mounted a fixed calibrated scale 26. As depicted in FIG. 3, calibrated scale 26 has an expanded scale portion 27, which corresponds to that length of tape 14 which wraps around outer drum 13. The calibrated scale 26 in the vertical-scale type instrument 32 cooperates with the readout line 29 carried by the tape 14 as shown in FIGS. 1 and 3. Line 29 may either take the form of a bar in the tape 14 or a transition line between two different colored sections of tape. The ratio of the expanded scale portion 27 to the more compressed or normal portion 34 of scale 26 is directly proportional to the ratio of the outer drum 13 diameter to inner drum 12 diameter.

The operation of the invention should be clear from the foregoing. As shaft 11 starts to rotate counterclockwise from the zero position shown in FIGS. 1–3, tape 14 is drawn over idler roller 18 and coils around inner drum 12 until finger member 21 engages drive pin 22. The rotational travel of drum 12 (see FIG. 2) is less than one revolution before finger member 21 contacts drive pin 22. It is not intended to restrict this rotational travel to less than one revolution, for if desired, it could be made to rotate several turns before engaging drive pin 22 by employing any one of several conventional methods. In the specific embodiment shown, the readout line 29 moves from the zero position to the 90% position on scale 26 as the finger 21 rotates from the position illustrated in FIG. 2 to the position in which it causes rotation of drum 13.

At the exact moment drive pin 22 is engaged, tape 14 undergoes an instantaneous change of speed as it begins to wrap around outer drum 13. This instantaneous change is effected by maintaining tape 14 at a point of tangency to the radius of outer drum 13. The change of speed factor is derived from the ratio between the diameters of the drums.

The transition point on the calibrated scale can be varied by changing the distance of rotational travel of inner drum 12 before it begins to drive outer drum 13. At a point 35 where the expanded scale portion 27 and the normal scale portion 34 abut, there is the transition or cross over point between the two scale portions.

Upon the engagement of drive pin 22, outer drum 13 is driven counterclockwise from the position shown in FIG. 2 until the maximum scale indication is reached; the slot 28 provides sufficient clearance for pin 19 during such movement of outer drum 13.

As shaft 11 returns in a clockwise direction to its zero position, the tape tension spring and the torsion spring 20 cause the drive pin 22 to maintain its position in engagement with finger 21 until such time as the stop pin 19 restricts further travel of the outer drum 13. At this point in the clockwise rotation of shaft 11, the tape 14 begins to feed from the inner drum 12.

There are several methods of having the expanded scale portion come at the beginning of the operation rather than at the end. One method would be to unwind the tape from the drum assembly as the shaft rotates. Another method would be to place the drum assembly at the other end of the tape.

The instrument 32 could be modified such that scale 26 and readout line 29 would be interchanged, i.e. scale 26 would be printed on tape 14 and readout line 29 would be a fixed line on display face 32.

The variable speed drum assembly of this invention is not restricted to only two speeds. Additional drums could be rotatably mounted concentric with outer drum 13 and driven in a similar manner by the succeeding smaller drum to provide a multiple speed drum assembly.

Instrument 9 provides a drive means to move a readout line on an indicator tape along a display scale in direct response to an input shaft's rotation. The display scale has a first portion with uniformly spaced graduations and a second portion with uniformly spaced graduations which are more widely spaced than the graduations of the first portion. The drive means comprises two concentrically mounted drums and a lost motion means which permits limited rotation of the inner drum while the outer drum remains stationary and thereafter causes the drums to rotate together.

As the tape wraps around the inner drum, the readout line moves along the first portion of the display scale and as the tape wraps around the outer drum, the readout line moves along the second portion.

One of the important features of the described invention is the means to provide for an instantaneous change in speed when the tape starts to coil around the outer drum. If it were not for this feature, errors would occur in the instrument readings whenever the indicator moves from one portion to the other portion of the display scale.

While there has been illustrated and described a single embodiment of the present invention, it will be apparent to those skilled in the art that numerous changes and modifications will occur and it is contemplated by the appended claims to cover all such changes and modifications as fall within the true spirit and scope of the present invention.

What is claimed as new and desired to be secured by Letters Patent of the United States is:

1. A device for measuring the rotation of an input shaft comprising: two concentrically arranged drums, the inner one of said drums being keyed to said shaft and the other of said drums being rotatably mounted on said shaft, means for holding said other drum in a start position, means for coupling said other drum to said shaft after said one drum has rotated through a fixed distance, an indicating tape having an end attached to said one drum and having a visible portion which includes a readout line, an indicating instrument having a calibrated scale with an expanded scale portion, said visible portion of said indicating tape being guided along said calibrated scale, whereby said tape coils around said one drum as it rotates through said fixed distance and thereafter coils around said other drum, said readout line being correlated to said scale such that said readout line enters said expanded scale portion as said tape begins coiling around said other drum.

2. A device as defined in claim 1, wherein said means for coupling said other drum is carried by said one drum.

3. A device as defined in claim 1, wherein said tape is led onto said one drum around a feeding means on said other drum and the tape is led to said feeding means on a line tangential to the outer periphery of said other drum whereby the tape is started wrapping on said other drum the instant said other drum is rotated.

4. A device as defined in claim 3, wherein said feeding means comprises an idler roller mounted on said other drum adjacent to an opening in its outer periphery including a stop means to position said outer drum at one limit of rotation such that said tape leads on a tangential line of said outer periphery to said opening and extends around said idler roller to said inner drum.

5. A device for measuring the rotations of an input shaft comprising: an inner drum carried upon and fixed to said shaft, an outer drum rotatably mounted concentric with said inner drum, a lost motion coupling between said inner and outer drums permitting limited rotation of said inner drum through a fixed distance while said outer drum is held stationary and thereafter causing said drums to rotate together, an indicating tape having one end attached to said inner drum, said indicating tape being drawn through an opening in said outer drum from said attached end, said indicating tape having a visible portion which has a readout line inscribed thereon, an indicating instrument upon which is mounted a calibrated scale having an expanded scale portion, said visible portion being arranged to move adjacent to said calibrated scale, whereby said tape coils around said inner drum as it rotates through said fixed distance and thereafter coils around said outer drum, said readout line being correlated to said scale such that said readout line enters said expanded scale portion as said tape begins coiling around said outer drum.

6. The device as defined in claim 5, wherein said lost motion means comprises a pin means mounted on said outer drum, and a drive means carried by said inner drum to engage said pin means after said inner drum has rotated a fixed distance.

7. A device as defined in claim 5 further comprising means for feeding said tape through said opening at a point tangential to the outer periphery of said outer drum.

8. A device as defined in claim 7 wherein said feeding means comprises an idler roller mounted on said outer drum adjacent to said opening and a stop means to position said outer drum at one limit of rotation such that said tape passes through said opening tangential to said outer drum and extends around said idler roller to said inner drum.

9. A device as defined in claim 8 including a spring means urging said outer drum against said stop means, said spring means permitting said inner drum to drive said outer drum when said inner drum has rotated a fixed distance.

10. An indicating instrument comprising a rotary input shaft, a readout scale unit having a stationary part and a movable part, one of said parts including a display scale having a first portion with uniformly spaced graduations and a second portion with uniformly spaced graduations which are more widely spaced than the graduations on said first scale portion, the other of said parts including an indicator, said movable part comprising an elongated tape mounted for movement along and in indicating relationship with said stationary part to provide an instrument reading at the intersection of said display scale and said indicator, a variable ratio drive means connected between said shaft and said tape to drive said tape in response to rotation of said shaft, said drive means comprising a pair of concentric drums, means for winding said tape on the inner one of said drums when said indicator registers with said first scale portion and on the outer one of said drums when said indicator line registers with said second scale portion, and a lost-motion coupling between said inner and outer drums to permit a limited rotation of said inner drum while said outer drum is stationary and thereafter to cause said drums to rotate together.

11. The instrument set forth in claim 10 wherein said outer drum has a peripheral surface having an opening through which the tape is led onto said inner drum, and including means guiding the tape to said opening on a line tangential to said outer drum.

12. An indicating instrument comprising a rotary input shaft, a display scale having a first portion with uniformly spaced graduations and a second portion with uniformly spaced graduations which are more widely spaced than the graduations on said first scale portion, a movable indicator tape mounted for movement along and in indicating relationship with said display scale, said tape having a readout line registering with said scale to provide instrument readings, a variable ratio drive means connected between said shaft and said indicator tape to drive said tape in response to rotation of said shaft, said drive means including a pair of concentric drums, means for winding said tape on said inner drum when said readout line registers with said first scale portion and on said outer drum when said readout line registers with said second scale portion, said winding means including a lost motion coupling between said inner and outer drums to permit limited rotation of said inner drum while said outer drum remains stationary and thereafter to cause said drums to rotate together.

13. The instrument of claim 12 wherein said outer drum has an opening through the surface one edge of which is a starting edge, means for guiding the tape onto said outer drum, and means for releasably holding said outer drum in a start position causing said tape to be led to said starting edge on a line tangential to said outer drum and to be drawn thereupon around said starting edge onto said inner drum.

References Cited

UNITED STATES PATENTS

| 743,531 | 11/1903 | Mahon | 33—140 |
|---|---|---|---|
| 2,326,835 | 8/1943 | Carter | 33—204.2 |
| 2,524,745 | 10/1950 | Adkins | 33—204.2 |
| 2,526,610 | 10/1950 | Piton | 116—124.1 |
| 2,642,746 | 6/1953 | Hulst | 116—124.1 X |
| 2,941,400 | 6/1960 | Nesbitt. | |
| 3,117,312 | 1/1964 | Watson. | |

FOREIGN PATENTS 501,545  3/1939  Great Britain.

LOUIS R. PRINCE, Primary Examiner

D. M. YASICH, Assistant Examiner

U.S. Cl. X.R.

33—204